United States Patent
Peacock (10) Patent No.: US 11,215,696 B2
(45) Date of Patent: Jan. 4, 2022

(54) CONTROLLED RADAR STIMULATION

(71) Applicant: QinetiQ Limited, Hampshire (GB)

(72) Inventor: Christopher John Peacock, Waterlooville (GB)

(73) Assignee: QINETIQ LIMITED, Hampshire (GB)

( * ) Notice: Subject to any disclaimer, the term of this patent is extended or adjusted under 35 U.S.C. 154(b) by 240 days.

(21) Appl. No.: 16/309,700

(22) PCT Filed: Jul. 7, 2017

(86) PCT No.: PCT/EP2017/067080
§ 371 (c)(1),
(2) Date: Dec. 13, 2018

(87) PCT Pub. No.: WO2018/011077
PCT Pub. Date: Jan. 18, 2018

(65) Prior Publication Data
US 2019/0137603 A1 May 9, 2019

(30) Foreign Application Priority Data
Jul. 15, 2016 (GB) ..................... 1612297

(51) Int. Cl.
*G01S 7/40* (2006.01)
(52) U.S. Cl.
CPC ........... *G01S 7/4052* (2013.01); *G01S 7/4095* (2021.05)
(58) Field of Classification Search
CPC ................ G01S 7/4052; G01S 2007/4095
USPC ......................................... 342/169
See application file for complete search history.

(56) References Cited

U.S. PATENT DOCUMENTS

| 2,952,848 A * | 9/1960 | Zahalka | G01S 7/40 342/172 |
| 5,164,734 A * | 11/1992 | Fredericks | G01S 7/4052 342/172 |
| 5,223,840 A * | 6/1993 | Cronyn | G01S 7/4052 342/170 |
| 5,431,568 A * | 7/1995 | Fey | G01S 7/4052 434/2 |

(Continued)

FOREIGN PATENT DOCUMENTS

| CN | 103163507 A | 6/2013 | |
| GB | 2491963 A * | 12/2012 | F41J 2/02 |

(Continued)

OTHER PUBLICATIONS

International Search Report and Written Opinion for PCT Patent App. No. PCT/EP2017/067080 (dated Oct. 5, 2017).

(Continued)

*Primary Examiner* — Olumide Ajibade Akonai
*Assistant Examiner* — Alexander L. Syrkin
(74) *Attorney, Agent, or Firm* — Kenealy Vaidya LLP (57) ABSTRACT

A method is disclosed that can include the steps of: in response to a radar stimulator aircraft receiving information for causing it to stimulate a radar system in a user specified manner, the radar stimulator aircraft monitoring the position of an onboard unit thereof relative to at least one antenna of the radar system; and based on the received information and the monitored position of the onboard unit the radar stimulator aircraft controlling its flight and the emission of radar signals thereby to stimulate the radar system in the user specified manner.

16 Claims, 5 Drawing Sheets

(56) References Cited

U.S. PATENT DOCUMENTS

| | | | | |
|---|---|---|---|---|
| 5,457,463 | A * | 10/1995 | Vencel | G01S 7/4052 342/169 |
| 5,518,400 | A * | 5/1996 | Otoide | G01S 7/4052 434/4 |
| 5,990,824 | A * | 11/1999 | Harrison | G01S 13/91 342/159 |
| 6,067,041 | A * | 5/2000 | Kaiser | G01S 7/4052 342/171 |
| 6,128,589 | A * | 10/2000 | Lilly | G06F 30/20 703/13 |
| 6,492,939 | B1 * | 12/2002 | Fredericks | G01S 7/4052 342/169 |
| 6,710,737 | B1 * | 3/2004 | Cronyn | G01S 7/4052 342/174 |
| 8,049,656 | B2 * | 11/2011 | Shani | H01Q 9/16 342/14 |
| 9,575,161 | B1 * | 2/2017 | Haghighi | G01S 13/931 |
| 11,131,751 | B2 * | 9/2021 | Steinmetz | G01S 7/4052 |
| 2005/0128136 | A1 * | 6/2005 | Wittenberg | G01S 7/4004 342/174 |
| 2006/0267832 | A1 * | 11/2006 | Newberg | G01S 7/4052 342/169 |
| 2008/0018523 | A1 * | 1/2008 | Kelly, Jr | G01S 7/354 342/70 |
| 2009/0224956 | A1 * | 9/2009 | Dark | G01S 7/38 342/13 |
| 2016/0088498 | A1 * | 3/2016 | Sharawi | G01R 29/10 370/241 |

FOREIGN PATENT DOCUMENTS

| | | | | |
|---|---|---|---|---|
| RU | 2337376 | C1 * | 10/2008 | G01S 7/40 |
| RU | 2533779 | C2 | 11/2014 | |

OTHER PUBLICATIONS

Search Report from GB Patent App. No. 1612297.0 (dated Dec. 28, 2016).

"Boeing EA-18G Growler" Wikipedia entry, downloaded from the internet Nov. 16, 2018, https://en.wikipedia.org/wiki/Boeing_EA-18G_Growler, pp. 1-8.

* cited by examiner

CONTROLLED RADAR STIMULATION

CROSS REFERENCE TO RELATED APPLICATION(S)

This application is a national phase filing under 35 C.F.R. § 371 of and claims priority to PCT Patent Application No. PCT/EP2017/067080, filed on Jul. 7, 2017, which claims the priority benefit under 35 U.S.C. § 119 of British Patent Application No. 1612297.0, filed on Jul. 15, 2016, the contents of each of which are hereby incorporated in their entireties by reference.

FIELD

This specification concerns the controlled stimulation of a radar system from an air borne platform.

BACKGROUND

Radio frequency (RF) radar target generators (RTGs) emit radiation to simulate RF skin reflections from targets back to a radar system of interest such that the radar system processes the RF signals as genuine target reflections. Many RTGs receive and temporarily store information representing the RF emissions from the radar system of interest and then return modulated copies of those emissions to simulate targets. In addition some commercially available RTGs enable the elevation of a synthetic radar target to be varied from the perspective of a radar system being tested by physically moving the RTG antennas. This enables the simulation of target scenarios to test the effectiveness of a radar system in the limited range of cases in which a target's bearing from the radar remains constant e.g. the firing of a shell or rocket. An example system is the RTG Towertrack System available from Intersoft Electronics. Disadvantageously this system cannot simulate targets that move independently in bearing as well as in elevation as viewed from the perspective of the radar system being tested and so the range of target scenarios that can be simulated is limited in this respect.

Motion of synthetic radar targets in bearing can be achieved by mounting an RTG onto a horizontal positioner such as a land-based vehicle. However, in practice, the angular extent of bearing changes achievable, and the rates of such bearing changes, are limited compared to what would be needed to simulate a real life scenario e.g. a fast jet fly past. In other words the extent and speed of motion of a land-based synthetic RTG achievable in practice is limited and so the range of target scenarios which can be simulated is similarly limited. In summary, combining independent target elevation and bearing motions using a land-based positioner such as a Towertrack mounted on a vehicle, in order to simulate realistic target scenarios, would be unwieldy, bulky and limited in performance.

Aspects of the presently disclosed subject matter are conceived to address the foregoing.

SUMMARY

According to an aspect of the presently disclosed subject matter there is provided a method including the steps of: in response to a radar stimulator aircraft receiving information for causing it to stimulate a radar system in a user specified manner, the radar stimulator aircraft monitoring the position of an onboard unit thereof relative to at least one antenna of the radar system; and based on the received information and the monitored position of the onboard unit the radar stimulator aircraft controlling its flight and the emission of radar signals thereby to stimulate the radar system in the user specified manner.

The received information may be indicative of a moving radar target scenario to be simulated and the radar signals emitted by the radar stimulator aircraft may be synthetic radar echoes for generating a synthetic moving radar target from the perspective of the radar system according to the moving radar target scenario to be simulated.

The radar stimulator aircraft may change its bearing and/or elevation relative to said at least one antenna of the radar system in order to change the bearing and/or elevation of the synthetic moving radar target.

The radial distance between the radar stimulator aircraft and said at least one antenna of the radar system may remain substantially constant.

The radar stimulator aircraft may control a delay between radar signals received from the radar system and the synthetic radar echoes generated to simulate radial motion of the synthetic moving radar target from the perspective of the radar system.

Each delay may represent the signal propagation period for the radar signal to transit from the position of the radar stimulator aircraft to a simulated radar reflective component of a target and reflect back as a radar echo to the position of the radar stimulator aircraft, thus simulating the physical offsets of the radar reflective target components from the radar stimulator aircraft.

The radar stimulator aircraft may also change its radial distance relative to said at least one antenna of the radar system, optionally in addition to controlling a delay between radar signals received from the radar system and the synthetic radar echoes, to change the radial distance of the synthetic moving radar target from the perspective of the radar system.

The radar stimulator aircraft may control the power of the synthetic radar echoes emitted based on changes in its radial distance relative to said at least one antenna of the radar system, for controlling radar cross section of the synthetic radar target from the perspective of the radar system.

The radar stimulator aircraft may control the power of the synthetic radar echoes emitted based on changes in its radial distance relative to said at least one antenna of the radar system, for controlling radar cross section of the synthetic radar target and signal propagation conditions from the perspective of the radar system.

The radar stimulator aircraft may adapt an input radar signal threshold condition based on changes in its radial distance relative to said at least one antenna of the radar system, for enabling determination of when an antenna pattern of the radar system is directed towards the radar stimulator aircraft.

The radar stimulator aircraft may control the Doppler of the synthetic radar echoes emitted based on the rate of change of its radial distance relative to said at least one antenna of the radar system, in order to account for Doppler effects caused by changes in radial distance between the radar stimulator aircraft and said at least one antenna of the radar system.

The radar stimulator aircraft may modulate the synthetic radar echoes emitted in order to simulate properties of the moving radar target being simulated, optionally by controlling the amplitude and/or frequency spectrum of the synthetic radar echoes.

In some implementations the received information may be indicative of a radar interference scenario and the radar signals emitted by the radar stimulator aircraft may be jamming signals for interfering with the radar system according to the radar interference scenario to be implemented.

Some implementations may further include the step of the radar stimulator aircraft monitoring the orientation of said onboard unit thereof and additionally using the monitored orientation to control its flight and the emission of radar signals thereby to stimulate the radar system in the user specified manner.

According to another aspect of the presently disclosed subject matter there is provided a computer program including computer executable instructions, which, when executed by computing apparatus, causes the computing apparatus to perform the heretofore described method.

According to another aspect of the presently disclosed subject matter there is provided a non-transitory computer readable storage medium having stored thereon computer-readable code, which, when executed by computing apparatus, causes the computing apparatus to perform the heretofore described method.

According to another aspect of the presently disclosed subject matter there is provided apparatus, the apparatus having at least one processor and at least one memory having computer-readable code stored thereon which when executed controls the at least one processor to execute the heretofore described method.

According to another aspect of the presently disclosed subject matter there is provided a radar stimulator aircraft configured to implement the steps of: in response to the radar stimulator aircraft receiving information for causing it to stimulate a radar system in a user specified manner, the radar stimulator aircraft monitoring the position of an onboard unit thereof relative to at least one antenna of the radar system; and based on the received information and the monitored position of the onboard unit the radar stimulator aircraft controlling its flight and the emission of radar signals thereby to stimulate the radar system in the user specified manner.

According to another aspect of the presently disclosed subject matter there is provided a method of stimulating a radar system using a radar stimulator aircraft including the steps of: receiving at the radar stimulator aircraft information for causing the radar stimulator aircraft to stimulate the radar system in a user specified manner by simulation of at least one radar target from the perspective of the radar system; monitoring at the radar stimulator aircraft the position of an onboard unit thereof relative to at least one antenna of the radar system; and based on the received information and the monitored position of the onboard unit, the radar stimulator aircraft controlling the flight of the radar stimulator aircraft and the emission of synthetic radar echoes by the radar stimulator aircraft thereby to stimulate the radar system with the at least one simulated radar target in the user specified manner.

The simulated radar target may also be referred to as a synthetic radar target.

According to another aspect of the presently disclosed subject matter there is provided a radar stimulator aircraft configured to stimulate a radar system, the radar stimulator aircraft configured to: receive at the radar stimulator aircraft information for causing the radar stimulator aircraft to stimulate the radar system in a user specified manner by simulation of at least one radar target from the perspective of the radar system, monitor at the radar stimulator aircraft the position of an onboard unit thereof relative to at least one antenna of the radar system; and based on the received information and the monitored position of the onboard unit, the radar stimulator aircraft being configured to control the flight of the radar stimulator aircraft and the emission of synthetic radar echoes by the radar stimulator aircraft thereby to stimulate the radar system with the at least one simulated radar target in the user specified manner.

BRIEF DESCRIPTION OF THE DRAWINGS

Embodiments of the disclosed subject matter will now be described by way of non-limiting example with reference to the accompanying drawings, in which.

DETAILED DESCRIPTION

A radar target simulator system includes an unmanned aerial platform for moving a radio frequency target synthesiser unit about the position of a radar system of interest in order to simulate radar targets that move radially, in bearing and in elevation from the perspective of the radar system according to a user-programmed scenario. Embodiments of the presently disclosed subject matter will initially be described in the context of a radar target simulator system used to stimulate, in a controlled manner, a radar system which has a single combined receive and transmit antenna, in other words meaning that the radar system uses a single antenna for both radar signal transmission and radar return signal reception. As will be described later on however, embodiments of the presently disclosed subject matter may alternatively be configured to stimulate, in a controlled manner, a radar system having multiple antennas (e.g. separate receive and transmit antennas).

Figure 1:
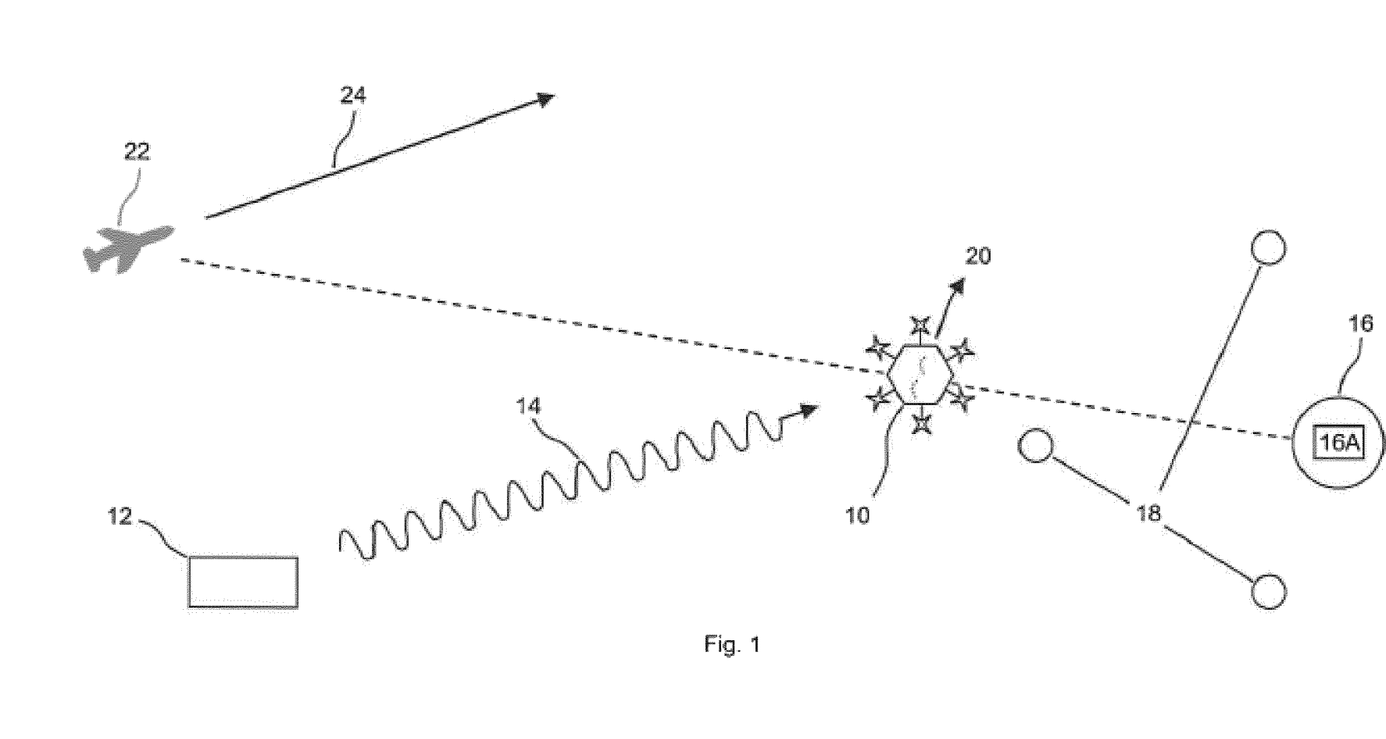
FIG. 1 is a schematic illustration of a radar target simulator system.

FIG. 1 illustrates a radar target simulator system including a radar target simulator aircraft 10 and an external (physically independent) control station 12, which are capable of wirelessly communicating with each other. The radar target simulator aircraft 10 is capable of receiving information 14 from the control station 12 indicative of a moving radar target scenario to be simulated. Additionally, the radar target simulator aircraft 10 is capable of determining the position, orientation and velocity (POV) of its onboard antennas relative to the antenna 16A of the radar system 16 to be tested, which can be enabled by an on board POV determining unit implementing global positioning system (GPS) or, more generally, global navigation satellite system (GNSS)) functionality or otherwise (e.g. such as the POV determining unit determining its POV relative to a plurality of triangulation signal emitters 18 at predetermined locations relative to the radar system 16). More specifically, by determining the position, orientation and velocity parameters of an onboard POV determining unit it is possible to calculate the POV parameters of respective onboard antennas.

Based on the information 14 received from the external control station 12 and the determined POV parameters of the aforementioned onboard POV determining unit, the unmanned radar target simulator aircraft 10 controls its flight and properties of synthetic radar echoes emitted thereby so as to generate a synthetic moving radar target 22 from the perspective of the radar system 16. This synthetic radar target 22 will appear to exhibit a similar radar cross section, and undergo similar movement from the perspective of the radar system 16, as the particular target specified by the information 14 from the control station 12.

For instance, looking at FIG. 1, the information 14 could contain instructions for causing the radar target simulator aircraft 10 to simulate a fighter jet fly by in order to test whether the radar system 16 can detect and track such an event effectively. In response to receiving such instructions 14 the radar target simulator aircraft 10 emits synthetic radar echoes having particular characteristics, and travels along the flight path denoted 20, to form the synthetic radar target 22 which viewed from the frame of reference of the radar system 16 has a radar cross section similar to that of a fighter jet and moves along a linear flight path 24. Other moving radar target scenarios could be simulated by controlling the flight of the unmanned radar target simulator aircraft 10 and the synthetic radar echoes emitted thereby in different ways e.g. rockets or missiles being launched or flying towards the radar system 16 or a helicopter etc.

Figure 2:
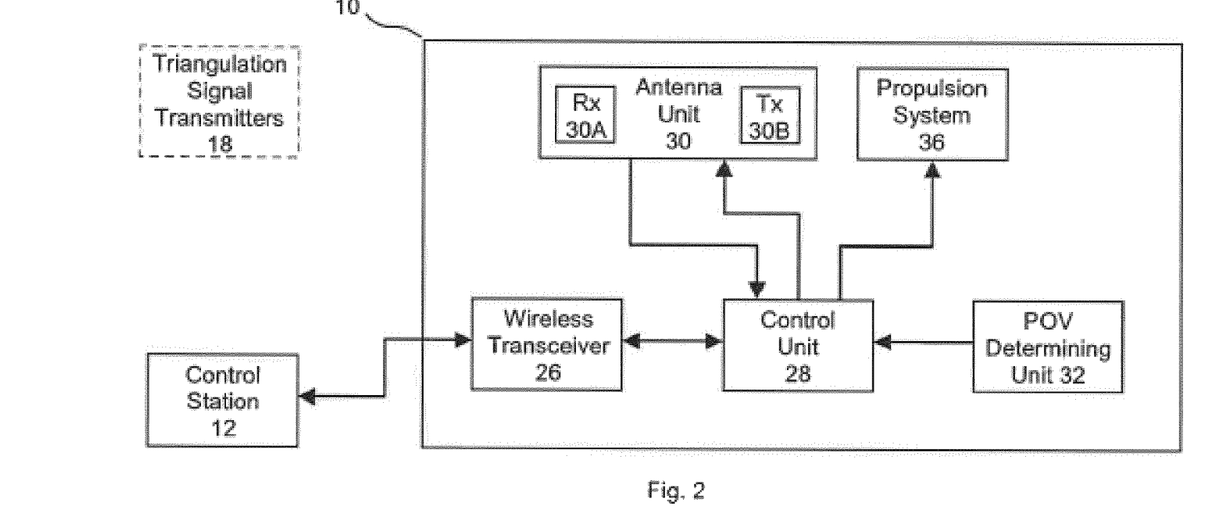
FIG. 2 is a schematic illustration of some internal components of the radar target simulator aircraft 10 in FIG. 1.

An example radar target simulator aircraft 10 embodiment is now described, wherein FIG. 2 illustrates some internal components thereof. A wireless transceiver 26 is provided for receiving information 14 from a control station 12 indicative of a moving radar target scenario to be simulated. This information is in the form of a series of computer executable instructions which, when executed by the radar target simulator aircraft 10, causes it to generate a synthetic radar target 22 of a user-specified nature. The wireless transceiver 26 passes such information 14 received from the control station 12 to a control unit 28 for execution. As will be described in more detail, on the basis of this information 14 and output received from a POV determining unit 32 the control unit 28 outputs control signals to an antenna unit 30 and also to a propulsion system 36 for controlling operation of the radar target simulator aircraft 10.

The antenna unit 30 in response to receiving such output signals from the control unit 28 generates synthetic radar echoes with appropriate characteristics for forming a synthetic radar target 22 of the required nature, whereas the propulsion system 36 in response to receiving such output signals from the control unit 28 causes the necessary aerial movement of the radar target simulator aircraft 10 for forming a synthetic radar target 22 of the required nature.

With further reference to the antenna unit 30, it includes a receive antenna 30A for converting electromagnetic radiation received from the radar system 16 to be stimulated for testing into RF electrical signals which are passed onto the control unit 28 and also includes a transmit antenna 30B for converting electrical signals generated by the control unit 28 representing synthetic target echoes into electromagnetic radiation for transmission to the radar system 16. Although not shown, in some embodiments the antenna unit 30 has a low noise amplifier and frequency converters in its receive path and a power amplifier and frequency converters in its transmit path.

With further reference to the POV determining unit 32, it is configured to determine its three-dimensional position, orientation and velocity relative to the antenna 16A of the radar system 16 to be stimulated for testing. As already mentioned this can be enabled using GPS receivers or by using signals received from triangulation signal transmitters 18 or other means and so details of the POV determining unit 32 will not be discussed in any more detail. Such POV information can be used by the control unit 28 to determine the POV parameters of each respective on board antenna relative to the antenna 16A of the radar system 16 to be stimulated. More specifically, based on pre-stored information (e.g. in the non-volatile memory 51 described later on) indicative of the position and orientation of each on board antenna 30A, 30B relative to the POV determining unit 32, the control unit 28 is able to make such a determination.

With further reference to the propulsion system 36, it will be appreciated that it may take various forms provided it is able to cause appropriate aerial motion of the radar target simulator aircraft 10. For example it may include one or more rotor blades, the collective and cyclic pitch of which may be varied to manoeuvre the radar target simulator aircraft 10 and if appropriate cause it to hover.

In view of the above it will become apparent that in use the control unit 28 compares the POV parameters of the respective on board antennas 30A, 30B required in order to implement the user specified radar target scenario with the corresponding determined POV parameters thereof. Based on this comparison the control unit 28 is able to determine the specific aerial motion required by the radar target simulator aircraft 10 to achieve the required POV parameters (accounting for the inertia of the radar target simulator aircraft 10 and the dynamic constraints of the propulsion system 36) and generates output signals for controlling the antenna unit 30 and propulsion system 36 appropriately. More specifically the propulsion system is controlled such that the receive and transmit antennas 30A, 30B of the antenna unit 30 are caused to undergo the required movement and remain substantially continuously pointing towards the antenna 16A of the radar system 16 to be stimulated, thereby maintaining a known gain characteristic and thus ensuring the correct target reflectivity is simulated.

Figure 3:
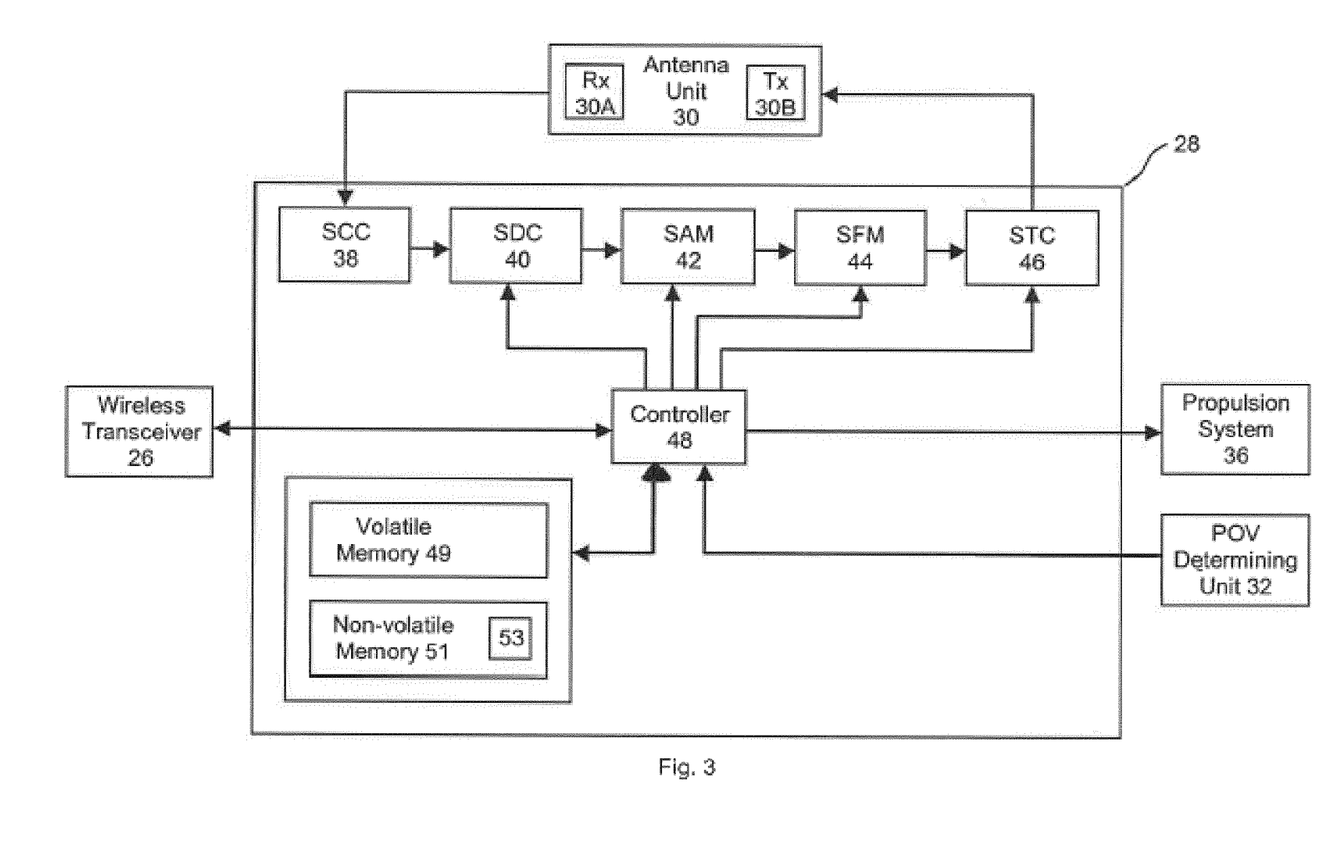
FIG. 3 is a schematic illustration of some internal components of the control unit 28 in FIG. 2.

FIG. 3 illustrates internal components of the control unit 28 heretofore described. In particular it includes a controller 48 which executes the instructions 14 received from the control station 12. It also has a radar signal capture circuit SCC 38 for storing radar signal data corresponding to radar signals received by the antenna unit 30 from the radar system 16 to be stimulated for testing. A signal delay circuit SDC 40 is provided for delaying stored radar signal data to model the range of the target being simulated. A signal amplitude modulator SAM 42 modulates the amplitude of delayed radar signal data to model target reflectivity and range of the target being simulated. A signal frequency modulator 44 modulates the frequency spectrum of delayed radar signal data to represent target spectral emissions of the target being simulated. A signal transmission circuit STC 46 generates electrical signals from the radar signal data that have been delayed by the SDC 40 and modulated by the SAM 42 and/or SFM 44 and outputs those signals to the antenna unit 30 for generating synthetic return echoes. Suitable components which are capable of implementing the described functionality of the SCC 38, SDC 40, SAM 42, SFM 44 and STC 46 will be apparent and so will not be described in more detail.

The controller 48 in communication with each of the SDC 40, SAM 42, SFM 44 and STC 46 is configured to receive the aforementioned instructions 14 from the control station 12 via the wireless transceiver 26 and to receive output generated by the POV determining unit 32 as heretofore described. It then processes this received information and in response communicates with each of the SDC 40, SAM 42, SFM 44 and STC 46 to cause the generation of synthetic radar echoes, and additionally communicates with the propulsion system 36 for controlling flight of the radar target simulator aircraft 10, both as heretofore described.

In another manner of speaking the controller 48 receives user-created synthetic target scenario programs from the external control station 12 via the wireless transceiver 26 in the form of command sequences and also receives output from the POV determining unit 32. In use it processes the received information by executing the received command sequences and in response outputs signals with appropriate latency compensation to control the SDC 40, SAM 42, SFM 44 and STC 46 within the control unit 28 so as to model the target range, reflectivity and spectral attributes of the radar target being simulated and to cause the propulsion system 36 to model motions of the radar target being simulated.

In particular under control of the user program the controller 48 may vary the delay implemented by the SDC 40 over time causing radial target motions including acceleration coasting and deceleration to be simulated. Under control of the user program the controller 48 may vary the amplitude modulation implemented by the SAM 42 over time causing changes in target reflectivity and/or radar propagation conditions to be simulated. Thus, optionally in conjunction with physical motions of the target simulator aircraft 10, changes in target radar cross section (RCS) with the aspect angle presented to the antenna 16A of the radar system 16 can be simulated by adjusting the amplitude modulation applied. Similarly, radar propagation effects such as atmospheric ducting can be simulated. Under control of the user program the controller 48 may also vary the frequency modulation implemented by the SFM 44 over time to cause a target having a time-varying frequency spectrum to be simulated. Thus, optionally in conjunction with physical motions of the target simulator aircraft 10, spectral features specific to aspect angle can be simulated. For example, a simulated target's Doppler shift can be made to vary as it flies past the radar system 16 in order to represent the scenario realistically. By means of another example, while a particular target presents a front or rear aspect angle to the radar system 16, spectral modulation representing jet engine modulation (JEM) can be simulated.

The controller 48 may take any suitable form, for instance it may be a microcontroller, plural microcontrollers, a processor, or plural processors. Furthermore the controller 48 will interact with both volatile memory 49 and non-volatile memory 51 in order to implement its functionality, whereby instructions 53 stored in such non-volatile memory 51 during manufacture will be loaded into the volatile memory 49 for execution by the controller 48 in use for causing it to perform its intended function—i.e. wait for and then execute user instructions once received. Additionally, while executing user instructions 14 received from the control station 12 the controller 48 may cause them to be stored in writable non-volatile memory (not shown) such as flash memory in addition to being stored in the volatile memory 49.

Furthermore, the radar target simulator aircraft 10 is configured to implement threshold functionality for determining when the antenna pattern of the antenna 16A of the radar system 16 to be stimulated is pointing towards it (specifically, towards its antenna unit 30) within an appropriate tolerance (typically the radar antenna beam width). This enables synthetic target echoes to be transmitted over similar bearing and elevation angles about the peak power or boresight as per actual target reflections. Moreover in implementing such threshold functionality if detected radar signals are not determined by the controller 48 to satisfy a particular condition (e.g. the detected intensity is determined to be below a threshold intensity) then it is determined that the antenna 16A of the radar system 16 is not pointing at the antenna unit 30, however, if detected radar signals are determined by the controller 48 to satisfy the aforementioned condition (e.g. the detected intensity is determined to be above the threshold intensity) it is determined that the antenna 16A of the radar system 16 is pointing at the antenna unit 30. This enables synthetic targets to be generated only when the antenna pattern is determined to be pointing at the radar target simulator aircraft 10, which, in addition to the aforementioned reason for performing threshold functionality, provides power saving advantages—particularly if the radar target simulator aircraft 10 is battery powered. Computer executable instructions for causing the controller 48 to implement such threshold functionality can be included in the computer executable instructions 14 received from the control station 12 (e.g. as a sub-routine). Alternatively however they can be included amongst the instructions 53 stored in the non-volatile memory 51 during manufacture, and the computer executable instructions 14 received from the control station 12 can refer to them and cause them to be executed in use.

In practice, upon moving the radar target simulator aircraft 10 in a radial direction relative to the antenna 16A of the radar system 16—if a radar target scenario to be implemented requires it—adjustment is needed of the aforementioned threshold condition used to determine whether the antenna pattern of the antenna 16A of the radar system 16 is pointing towards the radar target simulator aircraft 10 (specifically, towards its antenna unit 30). Continuing with the specific example in the previous paragraph in which the threshold condition concerns determining whether a threshold intensity has been exceeded, it will be understood that adjustment is needed with radial distance to account for the inverse nature of the relationship between 1) radar emitted signal power reaching the antenna unit 30 and 2) the distance between the antenna unit 30 and the antenna 16A of the radar system 16 to be stimulated. Computer executable instructions for causing the controller 48 to implement such threshold condition adjustment functionality can be included in the computer executable instructions 14 received from the control station 12 (e.g. as a sub-routine). Alternatively however they can be included amongst the instructions 53 stored in the non-volatile memory 51 during manufacture, and the computer executable instructions 14 received from the control station 12 can refer to them and cause them to be executed in use. More specifically, in executing such threshold condition adjustment functionality the controller 48 receives and processes information generated by the POV determining unit 32. Since such information can be used to determine the three-dimensional position, orientation and velocity of the on board antennas 30A, 30B relative to the antenna 16A of the radar system 16, on the basis of this information the controller 48 is able to adapt receiver signal power thresholding (or whatever other condition is used to determine whether the antenna pattern of the antenna 16A of the radar system 16 is pointing towards the radar target simulator aircraft 10) to account for changes in radial distance between the radar target simulator aircraft 10 and the antenna 16A of the radar system 16. In other words, continuing with the specific example of utilising a threshold intensity value, on the basis of information received from the POV determining unit 32 the controller 48 is able to adjust the threshold intensity level used for assessing whether or not the antenna pattern of the antenna 16A of the radar system 16 to be stimulated is pointing towards it.

The radar cross section (RCS) of a particular target can be simulated by modulating the power of synthetic radar echoes emitted back towards the antenna 16A of the radar system 16 to be tested. In practice though, upon moving the radar target simulator aircraft 10 in a radial direction relative to the antenna 16A of the radar system 16—if a radar target scenario to be implemented requires it—adjustment of the power of synthetic radar echoes emitted thereby will be required in order to account for differences in the power of synthetic radar echoes reaching the antenna 16A of the radar system 16 when emitted from different radial distances relative thereto. Computer executable instructions for causing the controller 48 to implement such power adjustment functionality can be included in the computer executable instructions received from the control station 12 (e.g. as a sub-routine). Alternatively however they can be included amongst the instructions 53 stored in the non-volatile memory 51 during manufacture, and the computer executable instructions 14 received from the control station 12 can refer to them and cause them to be executed in use. Regardless, in executing such power adjustment functionality, on the basis of output generated by the POV determining unit 32 the controller 48 can, by communicating with the SAM 42 cause modulation of the power of synthetic radar echoes to account for changes in radial distance between the radar target simulator aircraft 10 and the antenna 16A of the radar system 16.

Furthermore, upon moving a radar target simulator aircraft 10 in a radial direction relative to the antenna 16A of a radar system 16 to be stimulated—if a radar target scenario to be implemented requires it—adjustment of the Doppler frequency shift of synthetic radar echoes emitted thereby will be needed in order to avoid such radial movement adversely affecting the fidelity of the synthetic radar target 22. Computer executable instructions for causing the controller 48 to implement such Doppler adjustment functionality can be included in the computer executable instructions 14 received from the control station 12 (e.g. as a sub-routine). Alternatively however they can be included amongst the instructions 53 stored in the non-volatile memory 51 during manufacture, and the computer executable instructions 14 received from the control station 12 can refer to them and cause them to be executed in use. In particular on the basis of output generated by the POV determining unit 32 the controller 48 can, by communicating with the SDC 40, account for Doppler effects caused by a varying of radial distance between the radar target simulator aircraft 10 (specifically, its antenna unit 30) and the antenna 16A of the radar system 16 to be stimulated.

Figure 4:
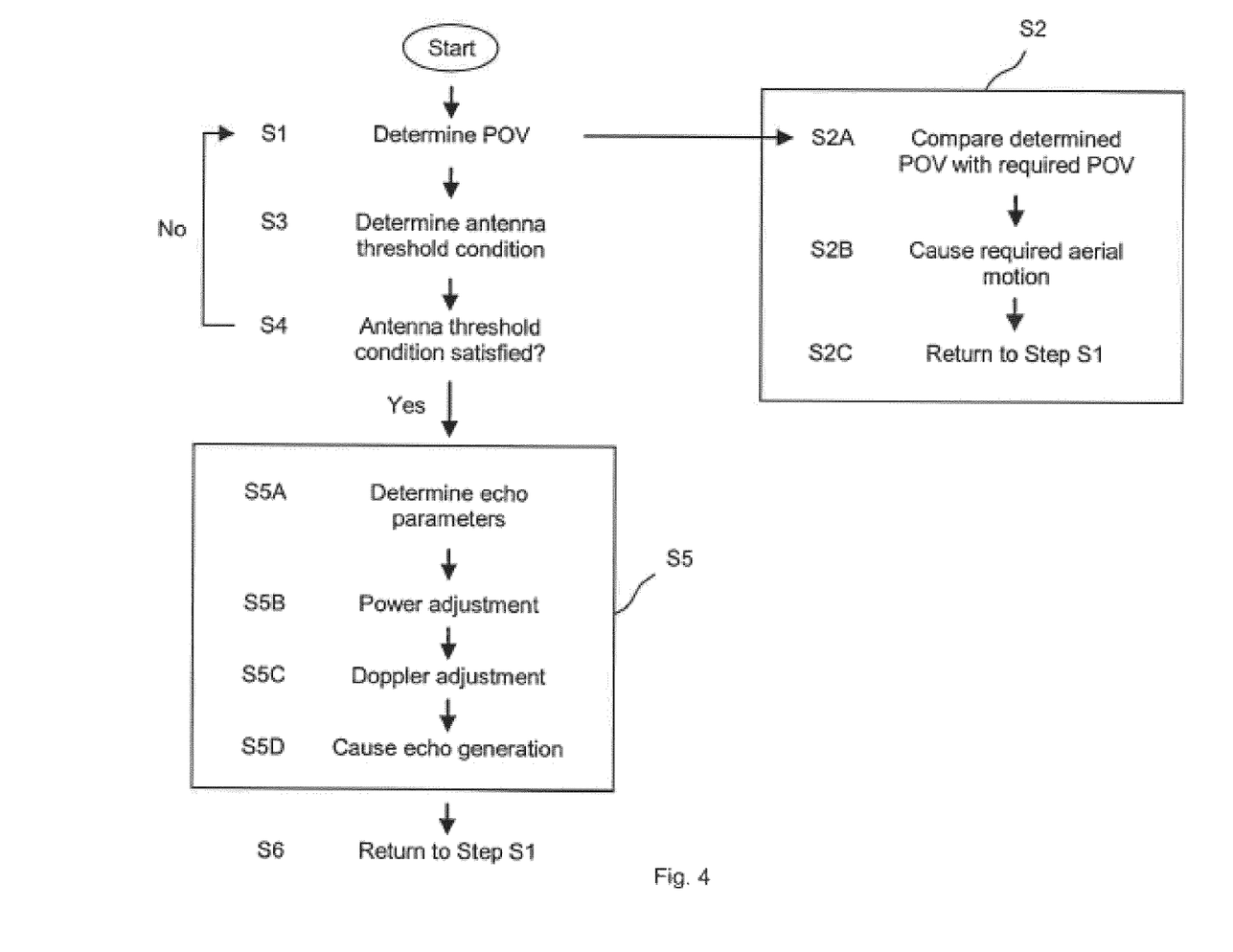
FIG. 4 illustrates a method according to an embodiment of the disclosed subject matter.

With reference to FIG. 4 the functionality of the heretofore described radar target simulator aircraft 10 can be described in terms of a method. In particular, upon receiving user instructions 14 transmitted from the control station 12 the controller 48 causes them to be loaded into the volatile memory 49 for execution. Whereby upon such execution the controller 48 is caused to implement the method in FIG. 4 including the initial step S1 of determining the real-time position, orientation and velocity of the transmit and receive antennas 30A, 30B of the radar target simulator aircraft 10 relative to the antenna 16A of the radar system 16 to be stimulated. It will be understood from the foregoing disclosure that this is achieved by processing output generated by the POV determining unit 32.

In step S2, based on the determined POV parameters for the respective onboard antennas 30A, 30B the controller 48 causes the radar target simulator aircraft 10 to undergo the required movement. More specifically this is achieved by the controller 48 in step S2A comparing the determined POV parameters of the respective onboard antennas 30A, 30B (determined in step S1) with those required for implementing the user specified radar target scenario. Subsequently in step S2B the controller 48 communicates with the propulsion system 36 for controlling it to cause the required motion in order to realise the required POV parameters (which could include hovering above a fixed ground location)—specifically in order to cause the required motion of the antennas of the antenna unit 30 relative to the antenna 16A of the radar system 16. In step S2C the method returns to step S1 for repeating steps S2A to S2C.

Simultaneously to implementing step S2 the controller 48 causes generation of the required synthetic radar echoes by implementing steps S3 to S5.

In particular in step S3 the controller 48 implements the aforementioned threshold condition adjustment functionality and uses the POV parameters determined in step S1 to determine a threshold condition (e.g. a threshold intensity value T) for determining whether the antenna pattern of the antenna 16A of the radar system 16 to be stimulated is pointing towards it as previously described.

Subsequently in step S4 if a detected radar signal is determined by the controller 48 to satisfy the determined threshold condition (e.g. to be above the determined threshold intensity value T) then it is determined that the antenna pattern of the antenna 16A is pointing at the antenna unit 30 and the method proceeds to step S5, whereas otherwise the method returns to step S1.

In step S5 the controller 48 causes the antenna unit 30 to generate a synthetic radar echo with the appropriate delay, modulation and power for generating the required synthetic radar target 22. More specifically, in step S5A the controller 48 determines from the user instructions 14 the delay, echo frequency modulation and echo amplitude modulation for generating the required synthetic radar target 22. In step S5B the controller 48 implements the aforementioned power adjustment functionality in order to determine the power at which the synthetic radar echo should be generated so as to achieve the required RCS from the perspective of the antenna 16A of the radar system 16 to be stimulated. Also in step S5C the controller 48 implements the aforementioned Doppler adjustment functionality to account for Doppler effects caused while the radial distance between the radar target simulator aircraft 10 and the antenna 16A of the radar system 16 to be stimulated is varying. Subsequently in step S5D the controller 48 communicates with each of the SDC 40, SAM 42, SFM 44 and STC 46 in order to delay, modulate and cause transmission of the synthetic radar echo in a manner appropriate for generating the required synthetic radar target 22 from the perspective of the antenna 16A of the radar system 16.

In step S6 the method then returns to step S1 for repeating steps S3 to S6. In practice, generation of synthetic radar echoes may take place continuously in response to radar signals whenever the aforementioned threshold condition is satisfied, while the echo parameters and power and Doppler adjustment parameters are continuously updated.

The process in FIG. 4 can be terminated at any time by transmitting a termination command from the control station 12 to the radar target simulator aircraft 10.

Upon reading the foregoing, it will be appreciated that radial motion of a synthetic radar target 22 from the perspective of the antenna 16A of the radar system 16 to be stimulated could be caused solely by changing the physical radial distance between the radar target simulator aircraft 10 and the antenna 16A of the radar system 16, or alternatively by a combination of 1) changing the physical radial distance between the radar target simulator aircraft 10 and the antenna 16A of the radar system 16 and 2) controlling operation of the SDC 40. However causing variations in the physical radial distance between the radar target simulator aircraft 10 and the antenna 16A of the radar system 16 to be stimulated requires various effects to be accounted for by the heretofore described threshold condition adjustment functionality, power adjustment functionality and Doppler adjustment functionality.

The amount of processing required in order to create a synthetic moving radar target 22 can be reduced by causing the radar target simulator aircraft 10 to maintain a substantially constant radial distance between it and the antenna 16A of the radar system 16 to be stimulated in use, as well as by continuously pointing the antennas of the antenna unit 30 towards the antenna 16A of the radar system 16. In such modes of operation radial motion of a synthetic radar target 22 from the perspective of the antenna 16A of the radar system 16 can be caused exclusively by controlling operation of the SDC 40. Changes in propagation attenuation due to changes in simulated target range from the antenna 16A of the radar system 16 can be simulated through modulation of the transmission power when a higher fidelity target simulation is required. Such modulation is typically made proportionate to a fourth power of the aforementioned range.

Advantageously, in such modes of operation processing is not required to account for effects caused by changes in radial distance between the radar target simulator aircraft 10 and the antenna 16A of the radar system 16 to be stimulated. In particular, it is no longer required to account for changes in radial distance by repeatedly executing the threshold condition adjustment functionality, power adjustment functionality and Doppler adjustment functionality. Moreover, while maintaining a constant radial distance between the radar target simulator aircraft 10 and the antenna 16A of the radar system 16, upon performing the method illustrated in FIG. 4 it is no longer required to implement steps S3 and S5B more than once for a particular radial distance from the antenna 16A of the radar system 16, whereas step S5C can be omitted.

In other words, upon implementing the method in FIG. 4 after having manoeuvred the radar target simulator aircraft 10 into the intended radial distance from the antenna 16A of the radar system 16, the threshold condition is determined by implementing step S3 just once, whereas it can be skipped in subsequent iterations of the method while maintaining a fixed radial distance. Similarly the power adjustment for synthetic radar echoes is determined by implementing step S5B just once, whereas this task can be skipped in subsequent iterations of the method while maintaining a fixed radial distance. Furthermore, while maintaining a fixed radial distance it is no longer required to account for the aforementioned Doppler effect and so step S5C can be omitted while a fixed radial distance is maintained.

In more detail, looking back to FIG. 1, in use the radar target simulator aircraft 10 could be controlled so that the radial distance between the antennas 30A, 30B of the antenna unit 30 and the antenna 16A of the radar system 16 to be stimulated for testing remains substantially constant— i.e. three dimensional motion of the radar target simulator aircraft 10 lies on a sphere centred at the antenna 16A of the radar system 16. In such instances, radial components of the motion of the synthetic radar target 22 viewed from the perspective of the antenna 16A of the radar system 16 can be simulated by controlling the SDC 40 in order to vary the duration of synthetic radar echo delays. Moreover by varying the extent of delays between 1) respective radar signals received by the receive antenna 30A of the antenna unit 30 from the antenna 16A of the radar system 16 and 2) synthetic radar echoes emitted from the transmit antenna 30B of the antenna unit 30 back towards the antenna 16A of the radar system 16, this can simulate radial motion of a synthetic radar target 22 from the perspective of the antenna 16A of the radar system 16. Non-radial (i.e. angular) components of the motion of such a synthetic radar target 22 from the perspective of the antenna 16A of the radar system 16 however can be caused by changing the aerial position of the radar target simulator aircraft 10, more specifically by changing the bearing and/or elevation of its antenna unit 30 relative to the antenna 16A of the radar system 16 while maintaining a substantially constant radial distance relative thereto.

Maintaining a substantially constant radial distance between the antennas 30A, 30B of the antenna unit 30 and the antenna 16A of the radar system 16 to be tested, and continuously pointing the antennas of the antenna unit 30 towards the antenna 16A of the radar system 16, has various advantages. For instance this maximises the receive path dynamic range available for target generation (since the receiver can be set up for a substantially constant input power level rather than needing a variable thresholding function to adapt to changes in radar signal propagation losses between the radar system 16 and the target simulator aircraft 10) and maximises the transmission path dynamic range available for target generation (since there is no need to adjust the transmission power to compensate for variations in radar signal propagation losses between the target simulator aircraft 10 and the antenna 16A of the radar system 16). Also the requirement to account for changes in radial distance by implementing threshold condition adjustment functionality, power adjustment functionality and Doppler adjustment functionality is removed.

It is here mentioned that the external (usually ground based) control station 12 includes functionality for enabling a user to create a series of instructions for execution by the controller 48 as heretofore described. To enable this the external control station 12 includes at least a user interface, command sequence generator functionality and a wireless communication link to the wireless transceiver 26 of the radar target simulator aircraft 10. The external control station 12 could thus be a desktop computer, a laptop computer, a tablet computer, a smart phone or otherwise.

In some embodiments, a single radar target simulator aircraft 10 can be used to produce multiple targets with different characteristics on the same elevation and bearing from the perspective of the antenna 16A of the radar system 16. This may be achieved by use of separate instances of at least the SDC 40, SAM 42, and SFM 44 within the control unit 28 for each target and replicating at least steps S5A and S5D for each target.

In some embodiments the control station 12 is capable of communicating with multiple radar target simulator aircraft 10 to simulate scenarios with multiple targets on different independent elevation/bearing/range combinations from the perspective of the antenna 16A of the radar system 16.

The optional triangulation signal transmitters 18 emit and, optionally, receive synchronisation signals which enable the POV determining unit 32 on board a radar target simulator aircraft 10 to determine its instantaneous position, orientation and velocity relative to the antenna 16A of the radar system 16 to be tested. The triangulation signal transmitters 18 are placed at known positions relative to the antenna 16A of the radar system 16 and thus provide an absolute local positional reference. Differentiation of the positional data within the POV determining unit 32 gives a velocity vector.

Such use of local positional reference emitters and a radar target simulator aircraft 10 mounted sensor unit 32 has the potential to significantly increase the accuracy of the determined position, orientation and velocity relative to the antenna 16A of the radar system 16 in comparison to the use of a GPS sensor. (The use of an attitude, heading reference system (AHRS), as is commonly available, to implement part or all of the POV functionality including filtering and differentiation simplifies implementation. The use of a Real Time Kinematics (RTK) system, as is commonly available, to implement part or all of the triangulation signal transmissions simplifies implementation.)

A single radar target simulator aircraft 10 can be used to simulate a highly realistic range of scenarios with full radial and angular motions, including but not limited to the following scenarios: surface vessels; aircraft fly past; aircraft overflight; aircraft hovering; aircraft flying directly towards the radar system 16; aircraft flying around the radar system 16; accelerating/decelerating targets; birds; combat air patrol; climbing targets; diving targets; multiple targets on the same elevation and bearing; popup targets; targets following ballistic trajectories; targets following trajectories that follow the curvature of the earth; terrain masking of targets; and terrain following targets.

Multiple radar target simulator aircraft 10 can be caused to operate simultaneously to simulate a highly realistic range of multiple-target scenarios with full radial and angular motions, including but not limited to the foregoing and following scenarios: formation flights; missile launch from a craft; bomb release from an aircraft; multiple warheads; merging targets; and splitting targets. Each radar target simulator aircraft 10 could be controlled to operate at a different range from the antenna 16A of the radar system 16 so as to reduce possibility of collision. Reducing the risk of collision during multi-target simulation scenarios is thus another advantage of controlling a radar target simulator aircraft 10 such that in use the radial distance between it and the radar system 16 to be tested remains substantially constant.

Particulars of other embodiments of the presently disclosed subject matter will now be described.

The information 14 from the control station 12 need not necessarily include a series of instructions and may instead be indicative of a user selection. In particular computer executable instructions for implementing a plurality of target scenarios may be pre-stored on the radar target simulator aircraft 10 during manufacture on the non-volatile memory 51. Upon receiving information 14 indicative of a user selection as to which pre-stored scenario is to be implemented the controller 48 loads the appropriate pre-stored executable instructions into the volatile memory 49 for execution thereby and subsequently causes formation of a synthetic radar target 22 of the required nature.

It will be appreciated that any functionality described herein as being provided by software could instead be provided by hardware (for example by one or more application specific integrated circuits), or indeed by a mix of hardware and software. For example it will be remembered in step S2A the controller 48 compares real-time three-dimensional position, orientation and velocity information with that required for implementing a user-specified moving radar target scenario. This functionality could be implemented under the control of software (e.g. by a processor executing instructions causing it to make such a comparison) or under the control of hardware (e.g. by a circuit including one or more logic gates or other components configured to receive two input signals and generate output indicative of the difference(s) between the two inputs).

In some embodiments the radar target simulator aircraft 10 could additionally be provided with functionality for steering the beam pattern of the antennas 30A, 30B of the antenna unit 30 towards the antenna 16A of the radar system 16 based on signals from the control unit 28. This could involve the antenna beams being physically steered using one or more electric motors or other physical actuators to rotate the antennas 30A, 30B using a closed loop control method, or alternatively the antenna beams could be steered electronically using a phase adjustment method. This functionality can complement aerial movement of the radar target simulator aircraft 10 caused by the propulsion system 36, for instance in the event that the radar target simulator aircraft 10 is not able to tilt its own body to achieve the required antenna elevation angle (e.g. in attempting to simulate an aircraft that passes over the radar system 16, a radar target simulator aircraft 10 would not easily be able to tilt its whole body through go degrees while hovering).

Figure 5:
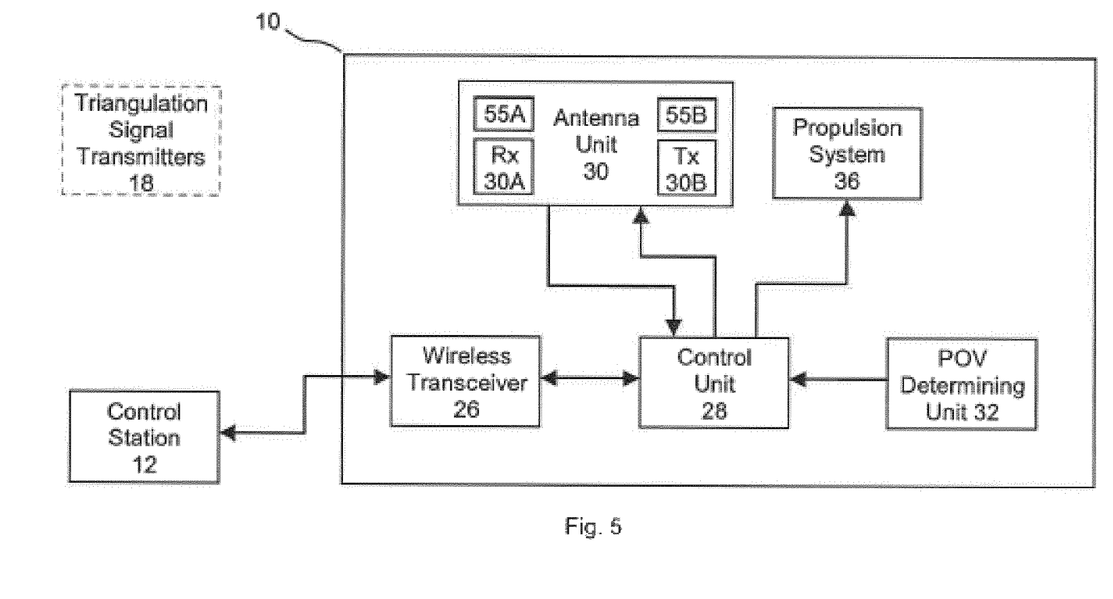
FIG. 5 is a schematic illustration of some internal components of a radar target simulator aircraft 10 according to another embodiment.

To illustrate the foregoing by example, in some embodiments each antenna in the antenna unit 30 is associated with a respective electro-mechanical mechanism for controlling antenna direction, illustrated in FIG. 5 as first and second directional controllers 55A, 55B which each include one or more electric motors or otherwise for controlling orientation of the receive and transmit antennas 30A, 30B (and thereby the antenna beams thereof) based on output from control unit 28 (specifically based on output from the controller 48). In use, output from the control unit 28 is provided to the propulsion system 36 for controlling aerial motion of the radar target simulator aircraft 10, whereas additional output from control unit 28 is provided to the or each aforementioned directional controller for controlling antenna orientation direction in the required manner to cause generation of the required synthetic radar target 22. Furthermore, in other embodiments, the antennas 30A, 30B of the antenna unit 30 could instead be steered in unison by a single directional controller common to both antennas.

With reference to the heretofore described threshold condition adjustment functionality it is here mentioned that in some embodiments the input signal threshold can be adapted to account for variations in antenna 30A gain with elevation and/or bearing angle relative to the position of antenna 16A of the radar system 16 to be stimulated, particularly in embodiments in which the antenna 30A of the antenna unit 30 is not tilted, or has limited scope for tilting in order to compensate for the angular gain characteristics of antenna 30A. This functionality could be implemented as part of steps S3 and S4 when implementing the method illustrated in FIG. 4.

With reference to the heretofore described power adjustment functionality, it is here mentioned that in some embodiments the output echo power can be adapted to account for variations in antenna 30B gain with elevation and/or bearing angle relative to the position of antenna 16A of the radar system 16 to be stimulated, particularly in embodiments in which antenna 30B of the antenna unit 30 is not tilted, or has limited scope for tilting in order to compensate for the angular gain characteristics of antenna 30B. This functionality could be implemented as part of step S5B when implementing the method illustrated in FIG. 4.

Furthermore, in some embodiments the input signal threshold condition and the output echo power can be adapted to account for variations in radar system 16 output transmission power over time. Algorithms for detecting temporal changes in radar system 16 antenna transmission power so as to enable this functionality will be familiar to persons skilled in the art and so will not be discussed in detail.

Also, in some embodiments the input signal threshold condition and the output echo power can be adapted to account for variations in radar system 16 transmission antenna beam width over time. Algorithms for detecting temporal changes in radar system 16 antenna beam width so as to enable this functionality will be familiar to persons skilled in the art and so will not be discussed in detail.

With reference to FIG. 3, the SAM 42 may have both digital and analogue components. The analogue components may advantageously be located in the processing path after the STC 46 or within the antenna unit 30 in order to maximise dynamic range.

As has already been described, in some embodiments the POV determining unit 32 can implement some processing functionality in order to determine its POV relative to the antenna 16A of the radar system 16 to be stimulated. Subsequently the controller 48 receives information indicative of such determined POV parameters and by comparing this information with pre-stored information (e.g. in the non-volatile memory 51) concerning the relative spatial relations between 1) the antennas of the antenna unit 30 and 2) the POV determining unit 32, the controller 48 can determine the POV parameters of each respective antenna— specifically it can determine the POV parameters of each respective on board antenna relative to the antenna 16A of the radar system 16 to be stimulated. This is the particular information that is determined and used when implementing steps S1 and S2 heretofore described.

However in other embodiments, the POV determining unit 32 may be replaced by a component which simply outputs raw data to the controller 48 that can be processed by the controller 48 to determine the POV of the aforementioned component relative to the antenna 16A of the radar system 16 to be stimulated. More specifically, the raw data output by the aforementioned component to the controller 48 is indicative of its absolute position and orientation (e.g. position references such as GPS co-ordinates and orientation references such as magnetic compass and gravity directional vectors). Subsequently based on this raw data and pre-stored information concerning the absolute position of the antenna 16A of the radar system 16 (e.g. the GPS co-ordinates of the antenna 16A pre-stored in the non-volatile memory 51) the controller 48 is able to determine the POV of the aforementioned component relative to the antenna 16A of the radar system 16 to be stimulated. Moreover, the controller 48 can use this determined POV information to then determine the POV for each on board antenna relative to the antenna 16A of the radar system 16, by using pre-stored information concerning the relative spacial relations between each of the antennas of the antenna unit 30 and the aforementioned component. This information could be determined and used when implementing steps S1 and S2 heretofore described.

For optimum performance, in implementing steps S1 and S2A of FIG. 4, a comparison is to be made between 1) the "determined" POV parameters of the phase centre for each respective on board antenna relative to the phase centre of the antenna 16A of the radar system 16 and 2) the "required" POV parameters of the phase centre for each respective on board antenna relative to the phase centre of the antenna 16A of the radar system 16 for implementing the user requested radar target scenario. However, in practice, the physical ranges of the on board antennas of the radar target simulator aircraft 10 from the antenna 16A of the radar system 16 will tend to dwarf any error due to approximating the position of the phase centre of a particular antenna to a position within the physical envelope of that antenna. As such, in situations when a lesser degree of accuracy is acceptable, in implementing steps S1 and S2A of FIG. 4 a comparison need only be made between 1) the "determined" POV parameters of each respective on board antenna relative to the antenna 16A of the radar system 16 and 2) the "required" POV parameters of each respective on board antenna relative to the antenna 16A of the radar system 16 for implementing the user requested radar target scenario—in other words it is not necessary to determine the position of the phase centre of respective antennas and it is sufficient to approximate this by merely utilising information concerning the spatial positions of the respective antennas more generally.

Furthermore, in some embodiments the POV determining unit 32 need not necessarily be required to determine and output information indicative of each of its position, orientation and velocity relative to the antenna 16A of the radar system 16 to be stimulated (or output raw information capable of being processed by the controller 48 to determine these parameters). For instance the POV determining unit 32 can be replaced by a component that is not concerned with determining or outputting data directly related to velocity information. Instead the aforementioned component could merely determine and output information indicative of each of its absolute position and orientation relative to the antenna 16A of the radar system 16 to be stimulated (or output raw information capable of being processed by the controller 48 to determine these parameters). Subsequently, based on this positional information, by a differentiation process the controller 48 will be able to determine the velocity parameters needed in order to implement steps S1 and S2A of the method illustrated in FIG. 4.

In yet further embodiments the POV determining unit can be replaced by a component that is not concerned with determining or outputting data directly related to each of orientation and velocity information. Instead the aforementioned component could merely determine and output information indicative of its absolute position relative to the antenna 16A of the radar system 16 to be stimulated (or output raw data capable of being processed by the controller 48 to determine this). Subsequently, based on this positional information, the controller 48 will by differentiation be able to determine the velocity parameters needed in order to implement steps S1 and S2A of the heretofore described method illustrated in FIG. 4. However the need to determine and use orientation information can be omitted if the antennas 30A, 30B of the antenna unit 30 have broad beam widths or omni-directional beam patterns, since this will minimise the consequence of lacking an orientation reference.

Up to now embodiments of the presently disclosed subject matter have been described in the context of a radar target simulator aircraft 10 for stimulating a radar system that has a single combined receive and transmit antenna 16A. However, some radar systems employ separate antennas i.e. one for radar signal transmission and another for radar return signal reception, which in some instances can be separated by a significant distance. Upon reading the foregoing teachings, it will be appreciated that if the antennas 30A, 30B of the antenna unit 30 on board a radar target simulator aircraft 10 are wide beam antennas or omni-directional antennas then this will accommodate an amount of physical separation between the radar antennas, dependent on the particular radar stimulation scenario. However, further embodiments of the presently disclosed subject matter have the capability to stimulate, in a controlled manner, such radar systems having separate transmit and receive antennas. Specifically, the POV function of the radar target simulator aircraft 10 is duplicated, whereby in implementing step S1 for instance 1) position and velocity (and optionally orientation) of the on board receive antenna 30A relative to the transmit antenna of the radar system 16 is determined in addition to 2) the position and velocity (and optionally orientation) of the on board transmit antenna 30B relative to the receive antenna of the radar system 16—which will be understood to be calculated by initially determining the position and velocity (and optionally orientation) of a component of the radar target simulator aircraft 10 (e.g. the POV determining unit 32) relative to the receive and transmit antennas of the radar system and then comparing this with pre-stored information indicative of the spatial relations between that component and the on board antennas. Subsequently, information indicative of 1) and 2) mentioned in the previous sentence are used in ways that will be apparent to persons skilled in the art upon reading the foregoing disclosure to implement the subsequent steps of the method illustrated in FIG. 4. For instance, in implementing step S2, the determined position and velocity (and optionally orientation) of the on board transmit antenna 30B relative to the receive antenna of the radar system 16 are compared with those parameters required to generate the required moving radar target. Furthermore, in implementing step S3, the distance between the on board receive antenna 30A relative to the transmit antenna of the radar system 16 is utilised.

Furthermore, continuing with the foregoing paragraph, antenna beam pointing functionality may be provided to enable the on board receive antenna 30A to be steered towards the position of the phase centre of the radar system transmit antenna and the on board transmit antenna 30B to be steered towards the position of the phase centre of the radar system receive antenna Similar to as has already been described in connection with FIG. 5, such beam steering functionality can be provided either mechanically or electronically using a phase adjustment method.

Up to now embodiments of the presently disclosed subject matter have been described as having both a transmit antenna 30A and receive antenna 30B within the antenna unit 30. However a single antenna could instead be provided that performs both radar signal reception and radar signal transmission by means of a circulator or other signal routing method that will be apparent to persons skilled in the art. In such embodiments the controller 48 is configured to control sequencing of the receive and transmit signals to and from the antenna.

In some embodiments the radar target simulator aircraft 10 can be controlled such that it does not output radar signals in response to having received a radar signal from a radar system 16 to be stimulated (i.e. it does not generate "echoes"). In other words the radar target simulator aircraft 10 can be controlled such that it does not simply wait for a radar signal to be received from a radar system 16 to be stimulated before it itself generates and outputs a radar signal. Instead the radar target simulator aircraft 10 can be caused to output radar signals exclusively on the basis of user instructions, independently of radar signals from the radar system 16 to be stimulated. In particular, during such use the controller 48 communicates with components of the radar target simulator aircraft 10 necessary to cause the radar target simulator aircraft 10 to undergo the required aerial motion (which could include hovering above a fixed ground position) and to output the required radar signals so as to cause generation of the required synthetic target 22 to be viewed from the frame of reference of the radar system 16 to be stimulated. In such embodiments the antenna unit 30 need not include a receive antenna 30A and associated receiving components.

The capability described in the previous paragraphs could be used for controlling the emission of interference signals to jam a radar system 16, whereby the radar target simulator aircraft 10 could be controlled to emit a series of radar signals for jamming a target radar system 16 and as such the radar target simulator aircraft 10 could more generally be referred to as a radar stimulator aircraft 10. For example, the target generator aircraft could generate multiple synthetic radar targets to increase the processing load on the radar system and/or radar operator personnel. As a further example, the target generator aircraft could generate a synthetic radar target or a plurality of synthetic radar targets to distract the radar operator personnel into believing one or more objects, having particular target attributes, are present in their surveillance region.

The use of relative positional sensing (such as by means of triangulation signal emitters 18) enables the radar stimulator aircraft 10 to stimulate a radar system 16 that is moving. Such embodiments that lack absolute positional sensing have the disadvantage that absolute movements of the radar system 16 become overlaid on the simulated target motion observed by the radar system (e.g. a simulated stationary target would have a constant positional offset from the radar, i.e. it would appear to be moving relative to any fixed position from the perspective of a moving radar system 16 that compensates for its own movement). Such embodiments would suffice for low fidelity applications including some jamming applications. However, to overcome this disadvantage, in further embodiments an absolute positional sensor (e.g. a GPS sensor) is also included within the radar stimulator aircraft 10. The controller 48 receives absolute positional data from this sensor and data indicative of its position relative to the radar system 16 from the triangulation signal emitters 18. The controller 48 uses said information to determine the absolute velocity vector of the radar system 16, from which it compensates for the absolute movements of the radar system when simulating targets by modifying the simulated target speed and Doppler according to the inverse speed vector of the radar system 16.

It will be appreciated that whilst various aspects and embodiments of the presently disclosed subject matter have heretofore been described, the scope of the presently disclosed subject matter is not limited to the embodiments set out herein and instead extends to encompass all methods and arrangements, and modifications and alterations thereto, which fall within the spirit and scope of the appended claims.

The invention claimed is:

1. A method of stimulating a radar system using a radar stimulator aircraft comprising:
   receiving information at the radar stimulator aircraft for causing the radar stimulator aircraft to stimulate the radar system in a user specified manner by simulation of at least one radar target from a perspective of the radar system, each simulated radar target being different from the radar simulator aircraft;
   monitoring at the radar stimulator aircraft a position of an onboard radar antenna thereof relative to at least one antenna of the radar system; and
   based on the received information and the monitored position of the onboard radar antenna, the radar stimulator aircraft controlling a flight of the radar stimulator aircraft and an emission of synthetic radar echoes by the radar stimulator aircraft thereby to stimulate the radar system with the at least one simulated radar target in the user specified manner,
wherein the radar stimulator aircraft controls a delay between a radar signal being received from the radar system by the onboard radar antenna and a synthetic radar echo being emitted from the onboard radar antenna to control a radial distance of the at least one simulated radar target from the perspective of the radar system, and
the radar stimulator aircraft changes its bearing and/or elevation relative to said at least one antenna of the radar system in order to change the bearing and/or elevation of the at least one simulated radar target to simulate target motions having tangential components.

2. The method of claim 1 wherein the radar stimulator aircraft causes the simulation of a user specified target scenario or a plurality of target scenarios from the perspective of a radar system that is to be stimulated or a plurality of radar systems that are to be stimulated.

3. The method of claim 2 wherein the user specified target scenario or plurality of target scenarios is a user-programmed scenario or plurality of scenarios.

4. The method of claim 1 wherein the radar stimulator aircraft causes the simulation in the user specified manner without requiring user intervention after receiving the information at the radar stimulator aircraft.

5. The method of claim 1, wherein the radar stimulator aircraft controls delays between radar signals being received from the radar system and synthetic radar echoes being emitted, each delay representing a signal propagation period for the radar signal to transit from the position of the radar stimulator aircraft to the at least one simulated radar target and reflect back to the position of the radar stimulator aircraft, to simulate motions of the at least one simulated radar target having radial components from the perspective of the radar system.

6. The method of claim 1, wherein the radar stimulator aircraft changes its radial distance relative to said at least one antenna of the radar system, optionally in addition to controlling delays between radar signals being received from the radar system and synthetic radar echoes being emitted, to control the radial distance of the at least one simulated radar target from the perspective of the radar system to simulate motion of the at least one simulated radar target having radial components from the perspective of the radar system.

7. The method of claim 6, wherein the radar stimulator aircraft controls the power of the synthetic radar echoes emitted based on changes in its radial distance relative to said at least one antenna of the radar system, for controlling a radar cross section of the at least one simulated radar target from the perspective of the radar system.

8. The method of claim 1, wherein the radar stimulator aircraft controls the power of the synthetic radar echoes emitted based on the user specified target scenario and changes in the distance between the radar stimulator aircraft and said at least one antenna of the radar system, for controlling the size of the radar cross section and radar signal propagation conditions for the at least one simulated radar target from the perspective of the radar system.

9. The method of claim 6, wherein the radar stimulator aircraft adapts a detected radar signal intensity threshold condition based on changes in its radial distance relative to said at least one antenna of the radar system, for enabling determination of when an antenna pattern of the radar system is directed towards the radar stimulator aircraft.

10. The method of claim 6, wherein the radar stimulator aircraft controls the Doppler frequency modulation of the synthetic radar echoes emitted based on the rate of change of its radial distance relative to said at least one antenna of the radar system, in order to account for Doppler effects caused by changes in radial distance between the radar stimulator aircraft and said at least one antenna of the radar system.

11. The method of claim 1, wherein the radar stimulator aircraft modulates the synthetic radar echoes emitted in order to simulate properties of the at least one simulated radar target being simulated, optionally by controlling the amplitude and/or frequency spectrum of the synthetic radar echoes.

12. The method of claim 1, wherein the received information is indicative of a radar interference scenario and the radar signals emitted by the radar stimulator aircraft are synthetic radar echoes which increase the processing load on the radar system according to the radar interference scenario to be implemented.

13. The method of claim 1, further comprising the radar stimulator aircraft monitoring the orientation of said onboard radar antenna thereof and additionally using the monitored orientation to control its flight and direct the emission of radar signals thereby to stimulate the radar system in the user specified manner.

14. The method of claim 1, wherein the radar stimulator aircraft emits one or more signals that simulate individual radar reflection echoes from individual components of the at least one simulated radar target.

15. A radar stimulator aircraft configured to stimulate a radar system, the radar stimulator aircraft configured to:
receive information at the radar stimulator aircraft for causing the radar stimulator aircraft to stimulate the radar system in a user specified manner by simulation of at least one radar target from a perspective of the radar system, each simulated radar target being different from the radar stimulator aircraft,
monitor at the radar stimulator aircraft a position of an onboard radar antenna thereof relative to at least one antenna of the radar system; and
based on the received information and the monitored position of the onboard radar antenna, the radar stimulator aircraft being configured to control a flight of the radar stimulator aircraft and an emission of synthetic radar echoes by the radar stimulator aircraft thereby to stimulate the radar system with the at least one simulated radar target in the user specified manner,
wherein the radar stimulator aircraft is further configured to control a delay between a radar signal being received from the radar system by the onboard radar antenna and a synthetic radar echo being emitted from the onboard radar antenna to control a radial distance of the at least one simulated radar target from the perspective of the radar system, and
the radar stimulator aircraft is further configured to change its bearing and/or elevation relative to said at least one antenna of the radar system in order to change the bearing and/or elevation of the at least one simulated radar target to simulate target motions having tangential components.

16. A non-transitory computer readable storage medium having stored thereon computer-readable instructions, which, when executed by computing apparatus, causes the computing apparatus to perform the method of claim 1.

* * * * *